United States Patent [19]
Akesaka

[11] Patent Number: 5,392,897
[45] Date of Patent: Feb. 28, 1995

[54] CONVEYOR
[75] Inventor: Toshio Akesaka, Kanagawa, Japan
[73] Assignee: Kabushiki Kaisha Iseki Kaihatsu Koki, Tokyo, Japan
[21] Appl. No.: 141,014
[22] Filed: Oct. 26, 1993
[30] Foreign Application Priority Data
Oct. 27, 1992 [JP] Japan .................................. 4-310766
[51] Int. Cl.6 ............................................. B65G 15/14
[52] U.S. Cl. .................................... 198/604; 198/607; 198/626.1
[58] Field of Search ............... 198/604, 606, 607, 620, 198/626.1, 626.2, 626.5, 815

[56] References Cited
U.S. PATENT DOCUMENTS

| | | | |
|---|---|---|---|
| 2,833,394 | 5/1958 | Cordis | 198/626.1 X |
| 3,672,487 | 6/1972 | Schneider | 198/604 X |
| 3,805,946 | 4/1974 | Yateman et al. | 198/607 X |
| 4,645,035 | 2/1987 | Bavis | 198/607 X |

FOREIGN PATENT DOCUMENTS
0848026 9/1952 Germany .......................... 198/626.1

Primary Examiner—James R. Bidwell
Attorney, Agent, or Firm—Townsend & Banta

[57] ABSTRACT

An abutment area is formed in which two belts 5, 6 are in contact with and confront each other. Link chains 23 carrying carrier rollers 24 are arranged in such a manner that carrier rollers 24 are disposed alternately on the back face of belt 5 and the back face of belt 6, in zigzags. The upper end is connected to winch 25, while the lower end is connected to weight 29. Link chains 23 are wound by winch 25, and link chains 23 are connected to the upper frame 17. When link chains 23 are stretched by weight 29, a force is given to respective belts 5, 6 through carrier rollers 24. Link chains 23 are released from upper frame 17, then link chains 23 are lowered and folded so that carrier rollers are positioned to be convenient for maintenance. Corridor for maintenance is unnecessary, and so cost is reduced.

4 Claims, 7 Drawing Sheets

CONVEYOR

BACKGROUND OF THE INVENTION

1. Field of the Invention

This invention relates to a vertical type conveyor provided with a frame, a plurality of belt pulleys rotatably supported by the frame, and first and second endless conveyor belts traveling around the plurality of belt pulleys and defining an abutment area in which the first and second conveyor belts are in contact with and confront each other, wherein the load to be conveyed is held between both the belts so that the load can be conveyed in the vertical direction.

2. Description of the Prior Art

Vertical type conveyors for carrying a load to be conveyed, such as granulated substances, i.e., concrete, cement, lime, ores, fertilizer, grains or slurry in the vertical direction, are known. For example, the conveyor comprises a supplying portion set up on the lower part, a vertical conveying portion, and a discharging portion provided above the vertical conveying portion. The conveyor also comprises a rigid frame and a plurality of rollers, a hopper, a shoot and a drive mounted on the frame. Namely, whole members of the conveyor are mounted on the frame, and the frame is designed according to the specification as to lifting height, conveying length and other considerations.

In the vertical conveying portion, a plurality of supporting rollers as back-up rollers or bearing rollers are disposed in zigzags. These supporting rollers are rototably supported by the frame. The supporting rollers act for increasing the supporting force for holding the load between belts and changing the supporting force according to the loose fitting state of the belts between which load is inserted. By giving a force to the belts, which are in contact with and confront each other in the vertical conveying portion, conveying of the load is smoothly carried out and the load is prevented from falling. Maintenance of the supporting rollers is usually carried out by workers.

In Japanese Patent Publication (KOKAI) 14806/1985 (Showa 60), a conveyor for conveying a load in inclined directions is disclosed, which comprises bearing rollers rototably mounted to a frame through a bracket, supporting levers having supporting rods connected with the bearing rollers in which one end is hinged to the frame, while the other end is connected to a weight and ropes wound on a pulley of a supporting lever for transmitting tension by weight to the supporting lever.

In a conveyor for conveying a load in an inclined direction, supporting or bearing rollers are attached at given intervals on the frame of the vertical conveying portion. Therefore, when maintenance on the supporting rollers is carried out, it is necessary that workers ascend and descend the frame to approach the supporting rollers for maintenance, consequently a great deal of labor is required for maintenance.

Further, to carry out the above-mentioned maintenance, plural corridors and stairs should be mounted to the frame at given intervals of height. Therefore, the number of members of the conveyor is increased by the members for the corridors and stairs, the strength of the frame itself should be increased in order to secure the members for the corridors and stairs to the frame.

Further, there is no freedom against changes in lifting height, since the frame is formed at a height according to the lifting height of the conveyor.

Further, the above-mentioned conveyor is designed one by one to meet the specification and the nature of the load to be conveyed. Therefore, even when taking the increase in common parts into consideration, to lower the cost of such a device is limited.

SUMMARY OF THE INVENTION

It is an object of the present invention to provide a vertical type conveyor in which operation efficiency for maintenance is improved, freedom of the conveyor against a change in lifting height is increased, and the cost of such a device is decreased.

The above-mentioned object is, according to the present invention, attained by a vertical type belt conveyor provided with a frame, a plurality of belt pulleys rotatably supported by the frame, and first and second endless conveyor belts traveling around the plurality of belt pulleys and defining an abutment area in which the first and second conveyor belts are in contact with and confront each other, wherein the load to be conveyed is held between both the belts so that the load can be conveyed in the vertical direction; characterized in that the vertical type belt conveyor comprises: a lower frame and an upper frame comprised in the frame; a pair of link chains composed of a plurality of links, articulated with each other, said pair of link chains being arranged along the abutment area lengthways; a tension device for stretching the pair of link chains, wherein the upper ends of the pair of link chains are releaseably connected to an upper frame, while the lower ends of the pair of link chains are connected to the tension device; carrier rollers in which the shaft ends are attached in joints between links, wherein the plurality of carrier rollers are disposed alternately on a first outside and a second outside opposite to the first outside in the cross direction of both the conveyor belts in zigzags so that when the pair of link chains are stretched by the tension device, components of tensile forces of the links act on both the conveyor belt through the carrier rollers.

In the above-mentioned conveyor, it is preferable that the upper ends of the link chains are connected to wires by a hoist disposed above the abutment area. It is also preferable that the vertical type conveyor comprise a lower structure portion in which the load to be conveyed is supplied, an upper structure portion from which the load is discharged, the vertical conveying portion is provided between the lower structure portion and the upper structure portion, the upper structure portion includes a plurality of rollers which are arranged at given places on a lower frame set upon the lower floor, while the upper structure portion includes a plurality of rollers which are arranged at given places on the upper frame above the vertical conveying portion.

According to the present invention, it is possible to improve operation efficiency for maintenance, freedom of the conveyor against lifting height, and the cost of such a device is decreased.

Namely, according to the present invention, a pair of link chains composed of a plurality of links articulated with each other are arranged along the abutment area in which the first and second conveyor belts are in contact with and confront each other lengthways. The upper ends of the pair of link chains are releaseably connected to an upper frame, while the lower ends of the pair of link chains are connected to the tension device, the plurality of carrier rollers in which the shaft ends are attached in joints between the links are disposed alternately on a first outside and a second outside opposite to the first outside in the cross direction of both the conveyor belts in zigzags. Accordingly, when the pair of link chains are stretched by the tension device, components of the tensile forces of the links act on both the conveyor belt through the carrier rollers. Accordingly, the load can be conveyed by being held between both the belts.

When maintenance operation is carried out, link chains are disconnected from the upper frame, then the link chains can be lowered, and folded. Accordingly, carrier rollers can be moved down so that the operator can perform maintenance on the carrier rollers without ascending and descending the frame.

The above-mentioned carrier rollers are mounted on link chains, so that maintenance for the carrier rollers can be carried out by lowering and folding the link chains. Therefore, it is unnecessary to provide a corridor and stairs in the vertical conveying portion of the conveyor for maintenance. Accordingly, cost of such a device can be decreased.

According to the present invention, a conveyor can be formed without providing a frame in the vertical conveying portion. Namely, the lower structure portion and the upper structure portion can be provided with a plurality of rollers supported by the lower frame and with plural rollers supported by the upper frame, respectively, and in the vertical conveying portion, carrier rollers carried on link chains are disposed. Therefore, even if the lifting height is changed, a conveyor can be adjusted to meet a change in lifting height by changing the height of the upper structure portion or the lower structure portion based on the lower structure portion or the upper structure portion, since the vertical conveying portion has no frame, the lower structure or the upper structure portion can be easily moved.

Further, plural standardized structures of the lower structure portion and the upper structure portion can be designed corresponding to the width of the first and second belts. Accordingly, even if a conveyor is newly set up, the conveyor can be adjusted to meet various lifting heights by suitably setting the length of the belt. Accordingly, it is possible that the amount of design work can be reduced, and parts which are used in common can be produced so that the cost of such a device can be decreased.

BRIEF DESCRIPTION OF THE DRAWINGS

The foregoing, and other objects and features of the present invention will become apparent from the following description of preferred embodiments of the present invention with reference to the accompanying drawings, in which:

FIG. 3(a) being an elevational view, and FIG. 3(b) being a plane view;

DETAILED DESCRIPTION OF THE PREFERRED EMBODIMENTS

Figure 1:
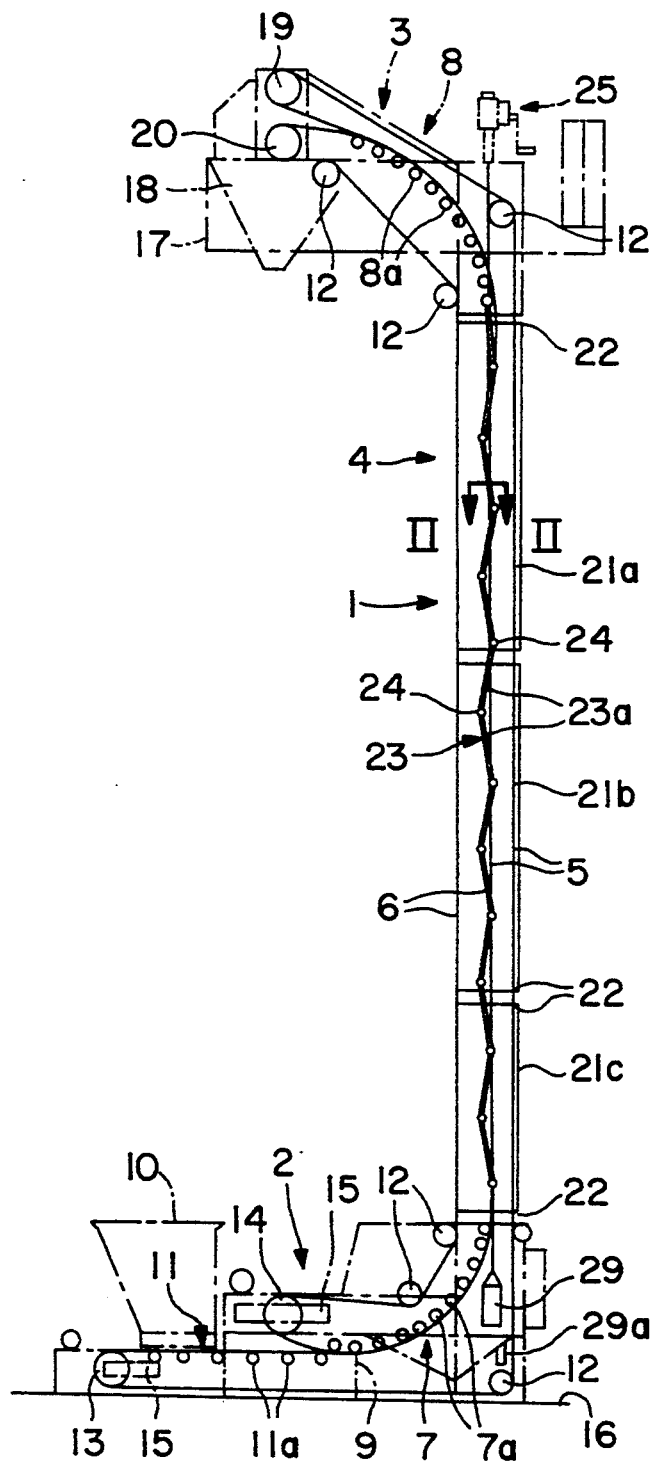
FIG. 1 is a side view of a conveyor of a first embodiment of the invention.

FIG. 1 shows a conveyor of a first embodiment of the present invention. The conveyor comprises rigid frames of a lower frame, a vertical frame, and an upper frame. First and second belts being in contact with and confronting each other with the load which is inserted between both the belts travels around a plurality of belt pulleys so that the load is conveyed from the lower part toward the upper part of the conveyor. Carrier rollers carried on link chains are disposed at the abutment area in a vertical conveying portion in which the first and second belts are in contact with and confront each other. When the load is conveyed, a hoist is wound so that the link chains are extended, the upper ends of the link chains are connected to the upper frame, and the lower ends thereof are connected with a tension device so that tensile force is applied to the link chains. Components of the tensile force act on both the outside of the first and second belts being in contact with and confronting each other through carrier rollers so that both the belts are brought closely into contact with each other, by which the load is prevented from falling between both the belts. Further, when maintenance of the conveyor is made, the upper ends of the link chains are disconnected from the upper frame, by which plural carrier rollers can be lowered and collected, and maintenance is facilitated. This embodiment, and the hereafter-mentioned second embodiment of the present invention are explained as conveyors in which the load is conveyed from the lower part toward the upper part of the conveyor.

Conveyor 1 comprises lower structure portion 2 in which a load to be conveyed is supplied, upper structure portion 3 from which the load is discharged, and vertical conveying portion 4 provided between lower structure portion 2 and upper structure portion 3. Supporting belt 5 as a first belt and conveying belt 6 as a second belt are provided from the lowering structure portion 2 to upper structure portion 3 through vertical conveying portion 4. Supporting belt 5 and covering belt 6 are in contact with and confront each other in lower curved conveying portion 7 mounted in lower structure portion 2, introduced to vertical conveying portion 4 while maintaining the state where both the belts are in contact with and confront each other, and traveling to upper curved conveying portion 8. After both the belts pass through upper curved conveying portion 8, covering belt 6 is detached from supporting belt 5 so that the load can be unloaded from supporting belt 5. After the load has been unloaded between supporting belt 5 and covering belt 6, supporting belt 5 and covering belts 6 are returned to lower curved portion 7 through a respective return route.

In the embodiment, conveyor 1 is formed into a C-typed conveyor in which a supplying direction of the load and a discharging direction of the load are the same. However, a conveyor, according to the present invention, is not restricted to a C-typed conveyor. The present invention can also be applied to a S-typed conveyor in which the conveying route is formed into an S-shape. Further, the present invention can also be applied to the other type of conveyor.

Lower structure portion 2 comprises lower frame 9 formed of a combination of structural steels such as H-steel, I-steel, channel steel, angle steel and the like, and plural rollers arranged at given places on lower frame 9. That is, a horizontal conveying portion 11 is mounted under and confronting hopper 10 for supplying the load in lower structure portion 2. Horizontal conveying portion 11 includes plural rollers 11a each having a given trough angle. A curved frame (not shown) is fixed to lower frame 9 at a place corresponding to lower curved portion 7 of lower frame 9. Plural rollers 7a are arranged on the curved frame.

Plural return rollers 12 are arranged so as to form return routes of the respective belts 5, 6, in lower structure portion 2. Tail pulley 13 as a first pulley is disposed at an end of the horizontal conveying portion 11. Supporting belt 5 travels around tail pulley 13. Tail pulley 14, as a second tail pulley, is disposed at an end of the lower curved portion 7. Covering belt 6 travels around tail pulley 14. Tail pulleys 13, 14 are mounted in take-up unit 15 fixed to lower frame 9, so that tensile force and meandering applied to respective belts 5, 6 can be adjusted by moving tail pulleys 13, 14 by operating take-up unit 15.

Lower structure portion 2 is set up on floor 16 situated at a level on the surface of earth or underground.

Upper structure portion 3 is formed of upper frame 17 which is different and independent from lower structure portion 2. In upper structure portion 3 the load conveyed from lower structure portion 2 is discharged to upper hopper 18 by covering belt 6, and then supplied to the given supplying part through upper hopper 18.

Upper frame 17 is formed by a combination of the structural steels as in lower structure portion 2. Upper structure portion 2 further comprises plural rollers arranged at given places on upper frame 17. That is, head pulley 19 for supporting belt 5 as a first head pulley at a position confronting upper hopper 18 on upper frame 17 is disposed, and head pulley 20 for covering belt 6 as a second head pulley is disposed at a position confronting upper hopper 18 under head pulley 19 for supporting belt 5 on upper frame 17. Further, in upper structure portion 3, plural return rollers 12 are arranged so as to form return routes of respective belts 5, 6. A curved frame (not shown) is fixed to upper frame 17 at a place corresponding to upper curved portion 8 of upper frame 17. Plural rollers 8a are arranged on the curved frame.

Head pulley 19 for supporting belt 5 is driven by a drive (not shown); covering belt 6 is moved following the travel of supporting belt 5 produced by frictional force on the contact surface of covering belt 6 with supporting belt 5. Accordingly, a drive including a drive motor, a reduction gear, change gear, and others is mounted on upper frame 17. The drive is connected with head pulley 19 for supporting belt 5 through a gearing member such as V belt, chain or other.

Vertical conveying portion 4 conveys the load in a vertical direction with a holding load between supporting belt 5 and covering belt 6 which are in contact with and confront each other. Vertical portion 4 includes a vertical frame formed of plural frame segments 21a ... 21c which is independent from lower frame 9 of lower structure portion 2 and upper frame 17 of upper structure portion 3. Respective vertical frame segments 21a ... 21c are formed as a towery frame formed of structural steels, in which rollers for supporting both the belts 5, 6 are not mounted for the conveying route or the return route of both the belts 5, 6. Further, connecting members 22 formed of angle or channel bars are secured to both ends of respective vertical frame segments so that lower frame 9, vertical frame segments 21a–21c, and upper frame 17 are connected with each other.

A variety of standardized vertical frames with sections corresponding to the belt width and various lengths can be prepared in advance for vertical conveying portion 4 so that the cost of such a device can be reduced by making members in common, or by reducing the cost of design. Further selection of vertical frame segments corresponding to lifting height required for a conveyor makes coping with various lifting heights possible.

A pair of link chains 23 are arranged on both sides of supporting belt 5 and covering belt 6, which are in contact with and confront each other in vertical conveying portion 4. Plural links 23c are articulated with each other, and the shafts of plural rollers 24 are attached on the joints of links 23a.

Several of links 23a are formed of rigid material with a preset length. Link chain 23 is formed of links 23a in which the number is determined according to lifting height of conveyor 1. Carrier rollers 24 are disposed alternately on both outsides or the back faces of supporting belt 5 and covering belt 6 which are in contact with and confront each other, while respective links 23a are arranged in zigzags so that respective links 23a are directed alternately from one back face of both belts 5, 6 being in contact with and confronting each other toward the other back face thereof and from the other back face thereof toward one back face thereof.

Figure 2:
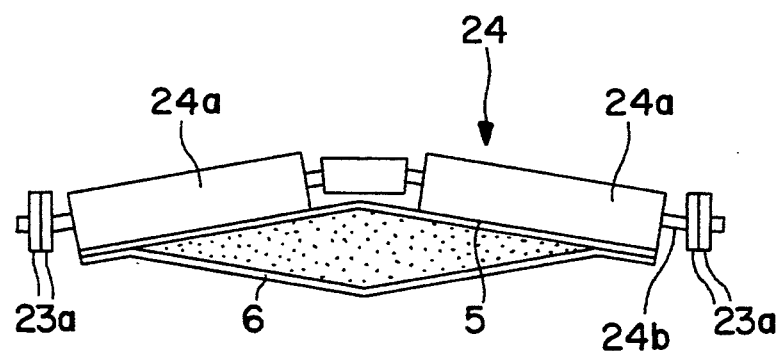
FIG. 2 is a view taken on line II—II of FIG. 1, in which carrier rollers mounted on link chains are shown.

Several of carrier rollers 24 are composed of two rollers 24a for supporting the back faces of several supporting belt 5 and covering belt 6 as shown in FIG. 2. Rollers 24a are carried rotatably on shaft 24b provided through a joint of links 23a. Further, vicinities of ends of shaft 24b are bent at a given angle so that the back faces of both the belts 5, 6 which become baggy by holding the load between both the belts 5, 6 can be held by rollers 24a. However, the construction of carrier roller 24 is not restricted to the present embodiment. For example, a universal joint, flexible shaft, or others can be utilized for shaft 24b.

Figure 3A:
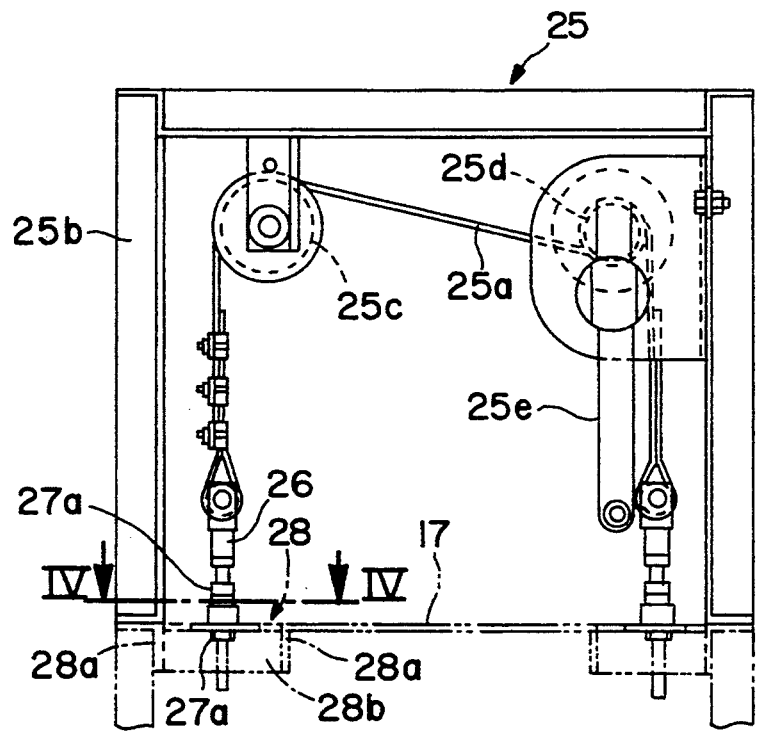
FIG. 3(a), (b) are views of a connecting device of link chains to a hoist.
Figure 3B:
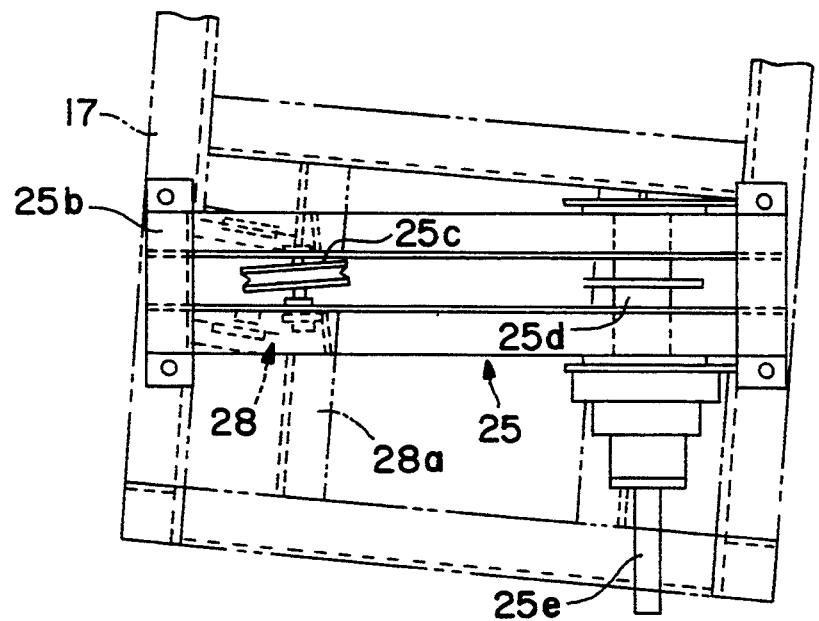
Figure 4A:
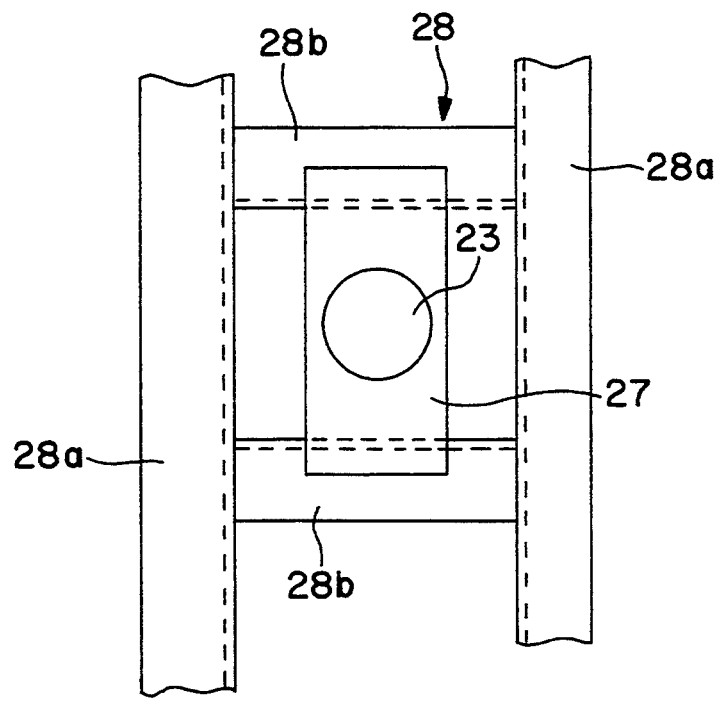
FIG. 4(a), (b) are views taken on IV—IV of FIG. 3(a), FIG. 4(a) showing a condition in which the upper end of the link chain is connected to an upper frame of the conveyor, and FIG. 4(b) showing a condition in which the upper end of the link chain is disconnected from the upper frame.
Figure 4B:
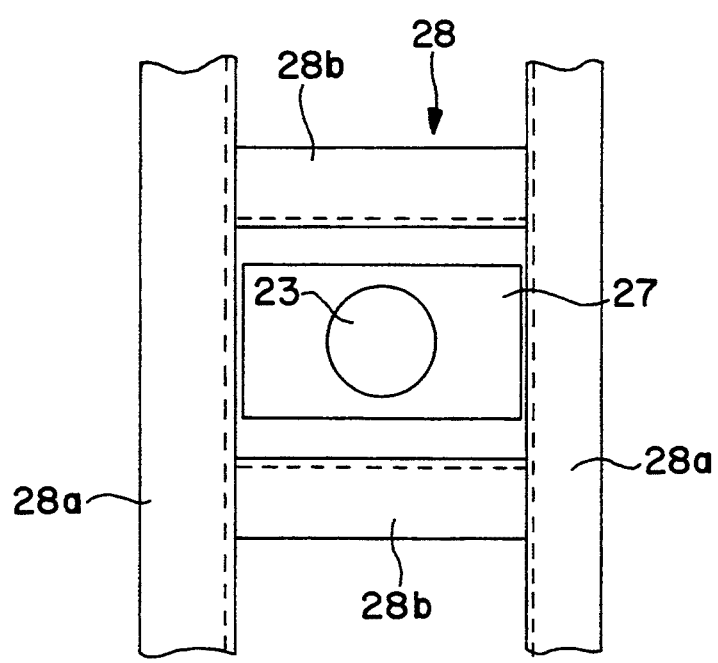

As shown in FIGS. 3 and 4, the upper ends of link chains 23 are connected to winch 25 as a hoist mounted on upper frame 17 through wires 25a, and can be connected and disconnected to and from upper frame 17. That is, winch 25 is formed with stand 25b at places on upper frame 17 above vertical conveying portion 4. Wire sheave 25c and hoisting drum 25d are mounted at a place on stand 25 facing link chains 23. Hoisting drum 25d is provided with a handle 25e so that wire 25a can be wound or unwound by turning handle 25e. Wire sheave 25c is disposed while being inclined at a given angle against hoisting drum 25d so that two wires 25a corresponding to a pair of link chains 23 can be wound without lapping of wires 25a.

Respective link chains 23 are connected with wires 25a through rod ends 26 fixed to the upper ends of respective link chains 23. Stop plate 27 formed of square plate is attached to the upper end of respective chains 23 by means of nut 27a. Upper frame 17 is provided with retaining parts 28 which retain or do not retain stop plate 27 by the direction of stop plate 27, in which when stop plate 27 is directed at 90 degrees against the direction of retaining part 28, stop plate 27 is retained to retaining part 28 so that respective link chains 23 are connected to upper frame 17, while when stop plate 27 is directed in parallel with retaining part 28, stop plate 27 is not retained to retaining part 28 so that respective link chains 23 are disconnected from upper frame 17. Retaining part 28 is formed of retaining members 28a, 28b secured to upper frame 17. Accordingly, when winch 25 is wound so that link chains 23 are extended, and stop plate 27 is passed between retaining members 28b of retaining part 28, stop plate 27 is turned 90 degrees. Thereafter, winch 25 is unwound so that link chains 23 are lowered, thereby stop plate 27 is retained to retaining members 28b of retaining part 28 so that link chains 28 are connected to upper frame 17. When winch 25 is wound so that stop plate 27 is released from retaining part 28, and then stop plate 27 is turned 90 degrees, winch 25 is unwound so that stop plate 27 is passed between retaining members 28b of retaining part 28, thereby link chain 23 can be lowered.

Weight 29, as a tension device, is connected to the lower end of link chains 23. Weight 29 is removably connected to the lower end of link chains 23, to which weight 29 with weight adapted for the property of the load to be conveyed and conveying weight can be connected. Herein, the tension device is not restricted to weight 29. For example, the rods of the hydraulic cylinder may be connected with the lower end of link chains 23. In this case, hydraulic pressure of hydraulic oil supplied to the hydraulic cylinder are suitably adjusted so that forces applied to both the belts 5, 6 by carrier rollers 24 through link chains 23 can be adjusted to a desired value.

In vertical conveying portion 4, when link chains 23 are wound by winch 25, link chains 23 are extended along supporting belt 5 and covering belt 6 which are in contact with and confront each other in the vertical direction, in which carrier rollers 24 are brought into contact with the back face of supporting belt 5 and the back face of conveying belt 6 which are alternately in contact with and confront each other. After weight 29 is connected to link chains 23, and stop plate 27 is passed between retaining members 28b of retaining part 28, stop plate 27 is turned 90 degrees, and winch 25 is unwound so that link chains 23 can be connected to upper frame 17.

Figure 5A:
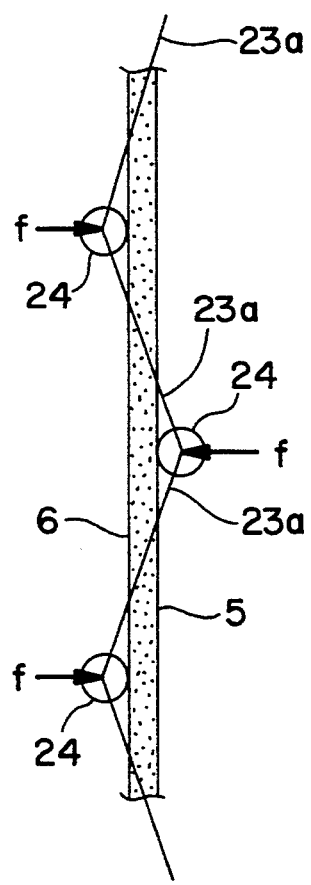
FIG. 5(a) and (b) are schematic illustrations for explaining a condition in which carrier rollers press against a contacting part of both the belts so that both the belts are closely in contact with each other in the touching part.

When link chain 23 is wound by winch 25 so that weight 29 is lifted, as shown in FIG. 5(a), the weight of weight 29 is transmitted to carrier rollers 24 through link chains 23. Further, force "f" acts on respective belts 5, 6 through carrier rollers 24. The force f is a component of tensile force F acting on link 23a from weight 29, in which the amount changes according to an angle between links 23a disposed above and below carrier roller 24.

When supporting belt 5 and covering belt 6 being in contact with and confronting each other with a uniform bulge is traveled, the same force f, from carrier rollers 24, acts on supporting belt 5 and covering belts 6 which are in contact with and confront each other. However, when the bulk is conveyed, it is rare that supporting belt 5 and covering belt 6, which are in contact with and confront each other, are deformed into a uniform baggy state, owing to the fluctuations of supply from lower hopper 10 to horizontal conveying portion 11. In such a case, the angle between links 23a changes partially so that different forces f act on local areas on both the belts 5, 6.

Figure 5B:
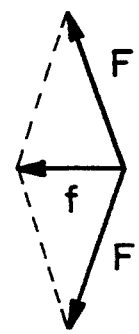

That is, at a portion in which a bulge of both the belts 5, 6 are larger than the other parts thereof, carrier rollers 24 are moved outward according to the extent of bulge, followed by an angle between links 23a disposed above and below carrier roller 24 being decreased. Therefore, as apparent in FIG. 5(b), force f, acting on each of supporting belt 5 and covering belt 6 is increased so that supporting belt 5 and covering belt 6 are pressed by a higher force. Accordingly, it becomes possible that supporting belt 5 and covering belt 6 are closely in contact with each other by force depending on the bulge of supporting belt 5 and covering belt 6 so that the load can be held between supporting belt 5 and covering belt 6. Accordingly, the load is prevented from falling into vertical covering portion 4 so that the load can be conveyed in the vertical direction under good conditions.

Figure 6:
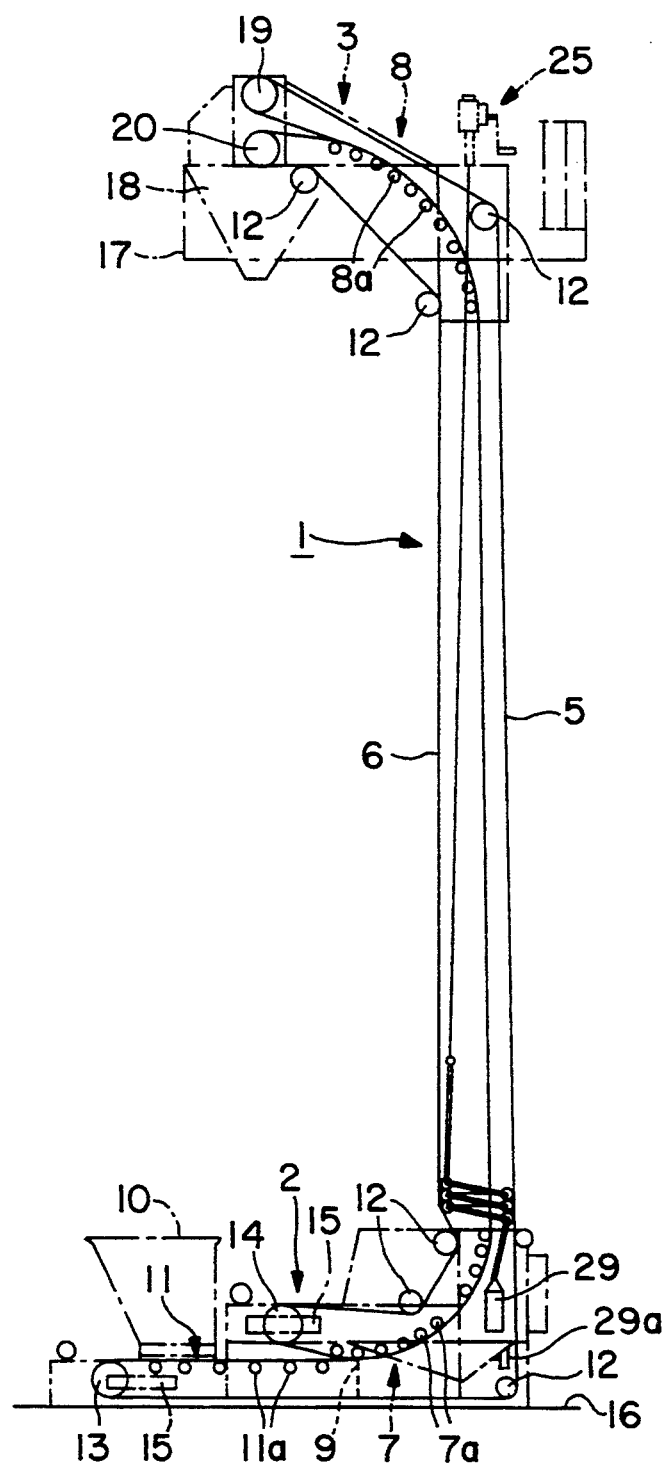
FIG. 6 is a side view of the conveyor, in which link chains are lowered by unwinding wires from the hoist.

When maintenance is carried out for link chains 23 and carrier rollers 24 arranged in vertical conveying portion 4, winch 25 is wound, then turned 90 degrees so that link chains 23 are released from upper frame 17. Further, as shown in FIG. 6, link chains 23 can be lowered by unwinding winch 25 so that link chains 23 can be folded, while weight 29 is held by supporting part 29a, by which link 23a and carrier rollers 24 can be moved toward the lower area of conveyor 1 to come closely in contact with each other. Accordingly, a worker can carry out maintenance without ascending and descending vertical frame segments 21a–21c of conveyor 1, which results in a remarkable improvement in maintenance work and a decrease in fatigue of the worker.

Figure 7:
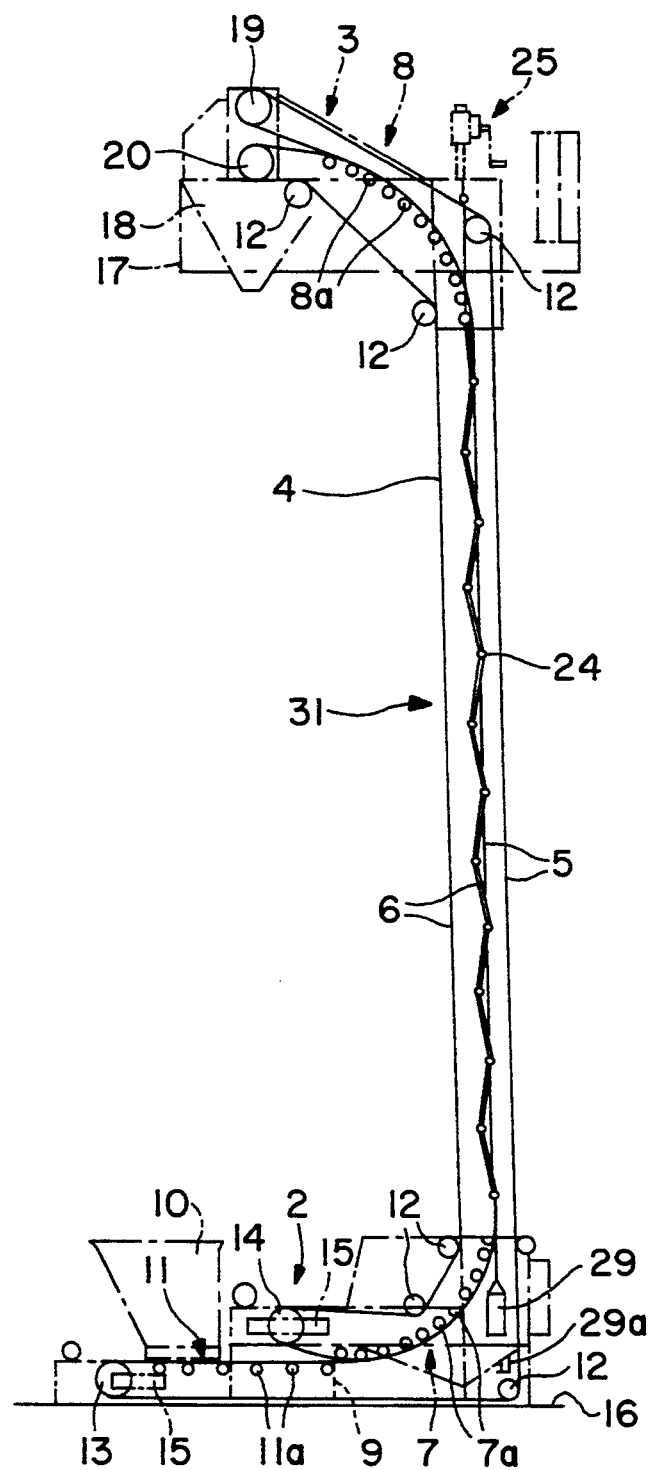
FIG. 7 is a side view of a conveyor of a second embodiment of the present invention.

FIG. 7 shows a second embodiment of the present invention, in which like reference characters designate like or corresponding parts throughout.

Conveyor 31 of the second embodiment comprises lower structure portion 2 formed of rigid frame 9, upper structure portion 4 formed of rigid frame 17, and vertical conveying portion 4 having no frame, wherein carrier rollers 24 carried on link chains 23 are disposed in vertical conveying portion 4. When the load is conveyed, link chains 23 can be extended by being wound from winch 25 mounted on upper frame 17, while tension can be applied by weight 29. In conveyor 31, maintenance work can also be easily carried out, freedom against a change of lifting height can be improved, and the cost of such a device can be decreased.

In the second embodiment, upper frame 17 of upper structure portion 3 is set up to a supporting part (not shown) so that it is maintained at a given height. When conveyor 31 is used as in the case of grain being stored in a silo, the silo or a structure portion of the silo can be used as the above-mentioned supporting part. Further, when conveyor 31 is used in case of ores being supplied to a storage yard within a building, a structure portion of the building can be used as the above-mentioned supporting part. Further, when conveyor 31 is used in case of grain or ores transported by a ship yard being conveyed to a truck or storage yard on the ground, the above-mentioned supporting part can be provided on a car or truck, to which upper frame 17 can be set up. In such a manner, the supporting part for setting up upper structure portion 3 is not restricted, but can be suitably set according to the structure existing in the vicinity of conveyor 31.

In conveyor 31, when changing the lifting height of conveyor 31 is needed, the basic set-up level of conveyor 31 is kept at lower structure portion 2 or upper structure portion 3, while the level of upper structure portion 3 or lower structure portion 2 is changed. Herein, since lower structure portion 2 and upper structure portion 3 or lower structure portion 2 is changed. Herein, since lower structure portion 2 and upper structure portion 3 are formed of lower and upper frames, independent from each other, a change in the lifting height can be easily made. Then, when it is necessary to alter the lengths of supporting belt 5 and covering belt 6 according to a change in the lifting height, both the belts 5, 6 may be changed. When the changed lifting height is extremely small so that it can be absorbed by changing the position of first and second tail pulleys 13, 15, take-up unit 15 is operated so that the positions of the first and second pulleys 13, 14 can be adjusted.

In the first and second embodiments, in which the tension means for applying to supporting belt 5 and covering belts 6 is formed of the take-up unit of the first and second tail pulleys has been explained. However, the present invention is not restricted to the above-mentioned construction. A detour may be provided in the return route of each of supporting belt 5 and covering belt 6, in which a weight may be disposed. In this case an extremely small change in lifting height can be absorbed by the length of the detour.

What is claimed is:

1. A vertical type conveyor provided with a frame, a plurality of belt pulleys rotatably supported by the frame, and first and second endless conveyor belts traveling around the plurality of belt pulleys and defining an abutment area in which the first and second conveyor belts are in contact with and confront each other, wherein a load to be conveyed is held between both belts so that the load can be conveyed in the vertical direction, said vertical type conveyor comprising:
   a lower frame and an upper frame comprise the frame;
   a pair of link chains composed of a plurality of links articulated with each other, said pair of link chains being arranged along the abutment area lengthwise;
   a tension device for stretching the pair of link chains, wherein the upper ends of the pair of link chains are releaseably connected to an upper frame, while the lower ends of the pair of link chains are connected to the tension device;
   carrier rollers in which the shaft ends are attached in joints between the links, wherein the plurality of carrier rollers are disposed alternately on a first outside and a second outside opposite to the first outside in the cross direction of both the conveyor belts in zigzags so that when the pair of link chains are stretched by the tension device, components of tensile forces of the links act on both the conveyor belts through carrier rollers.

2. A vertical type conveyor as claimed in claim 1, wherein the upper ends of said link chains are connected to wires of a hoist disposed above the abutment area.

3. A vertical type conveyor in accordance with claim 1 wherein the vertical type conveyor comprises:
   a lower structure portion in which a load to be conveyed is supplied,
   an upper structure portion from which the load is discharged, and
   the vertical conveying portion is provided between the lower structure portion and the upper structure portion, the lower structure portion includes a plurality of rollers which are arranged at given places on a lower frame set up on the lower floor, while the upper structure portion includes a plurality of rollers which are arranged at given places on the upper frame above the vertical conveying portion.

4. A vertical type conveyor in accordance with claim 2, wherein the vertical type conveyor comprises:
   a lower structure portion in which a load to be conveyed is supplied,
   an upper structure portion from which the load is discharged, and
   the vertical conveying portion is provided between the lower structure portion and the upper structure portion, the lower structure portion includes a plurality of rollers which are arranged at given places on a lower frame set up on the lower floor, while the upper structure portion includes a plurality of rollers which are arranged at given places on the upper frame above the vertical conveying portion.

* * * * *